Aug. 31, 1954

C. S. KELLEY 2,687,786

DISK BRAKE

Filed April 27, 1950

3 Sheets-Sheet 1

INVENTOR.
Cecil S. Kelley
BY
Frank E. Miller
ATTORNEY

Patented Aug. 31, 1954

2,687,786

UNITED STATES PATENT OFFICE 2,687,786

DISK BRAKE

Cecil S. Kelley, Forest Hills, Pa., assignor to Westinghouse Air Brake Company, a corporation of Pennsylvania Application April 27, 1950, Serial No. 158,549

9 Claims. (Cl. 188—107)

This invention relates to disc brake apparatus and more particularly to the fluid pressure controlled type for use on railway vehicles or the like.

One object of the invention is the provision of an improved relatively simple and inexpensive brake apparatus of the above type.

Another object of the invention is the provision of such a brake apparatus embodying improved means operable by hand for applying the brakes.

Other objects and advantages will become apparent from the following more detailed description of the invention.

Figure 1:
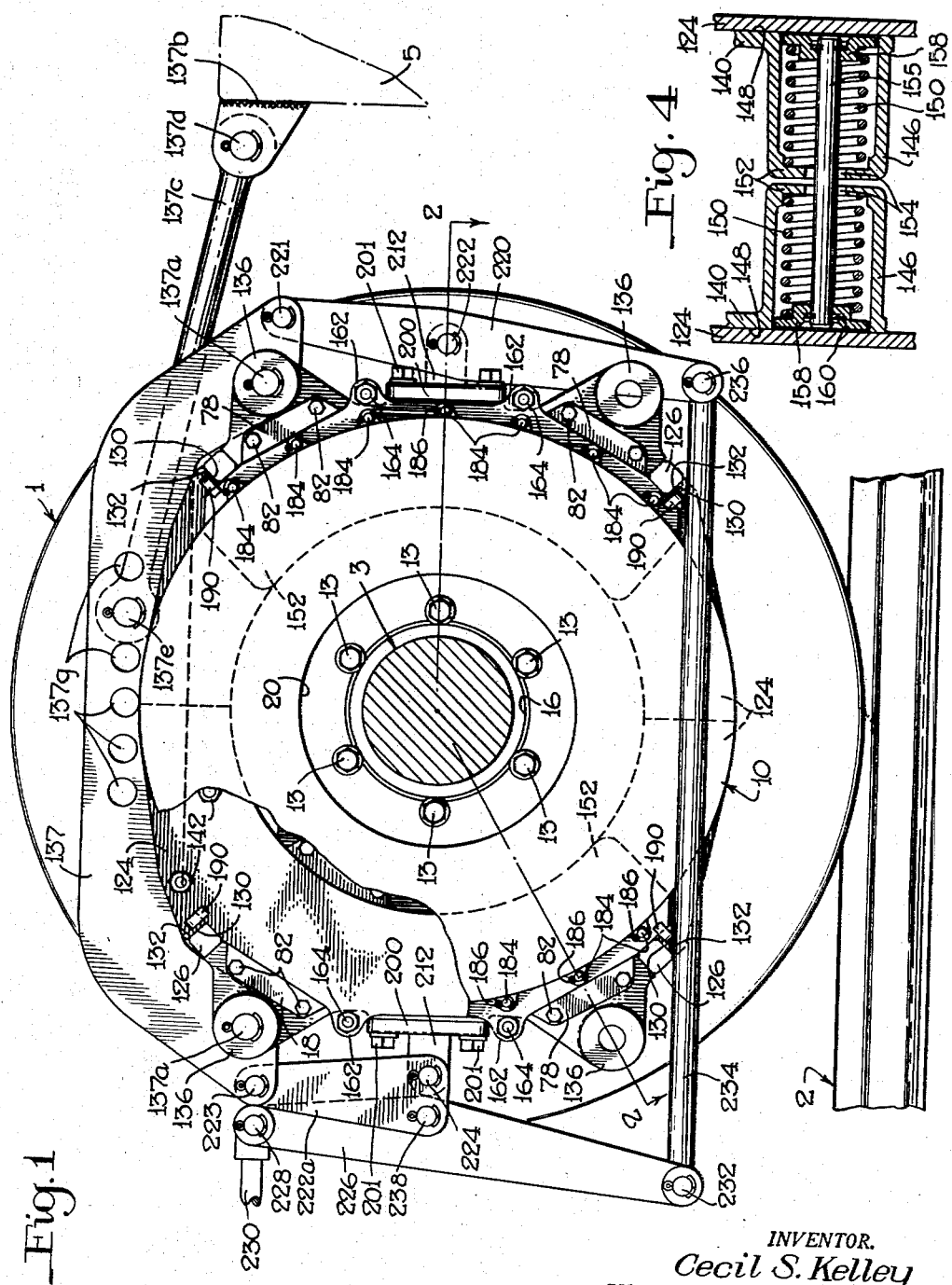
Figure 2:
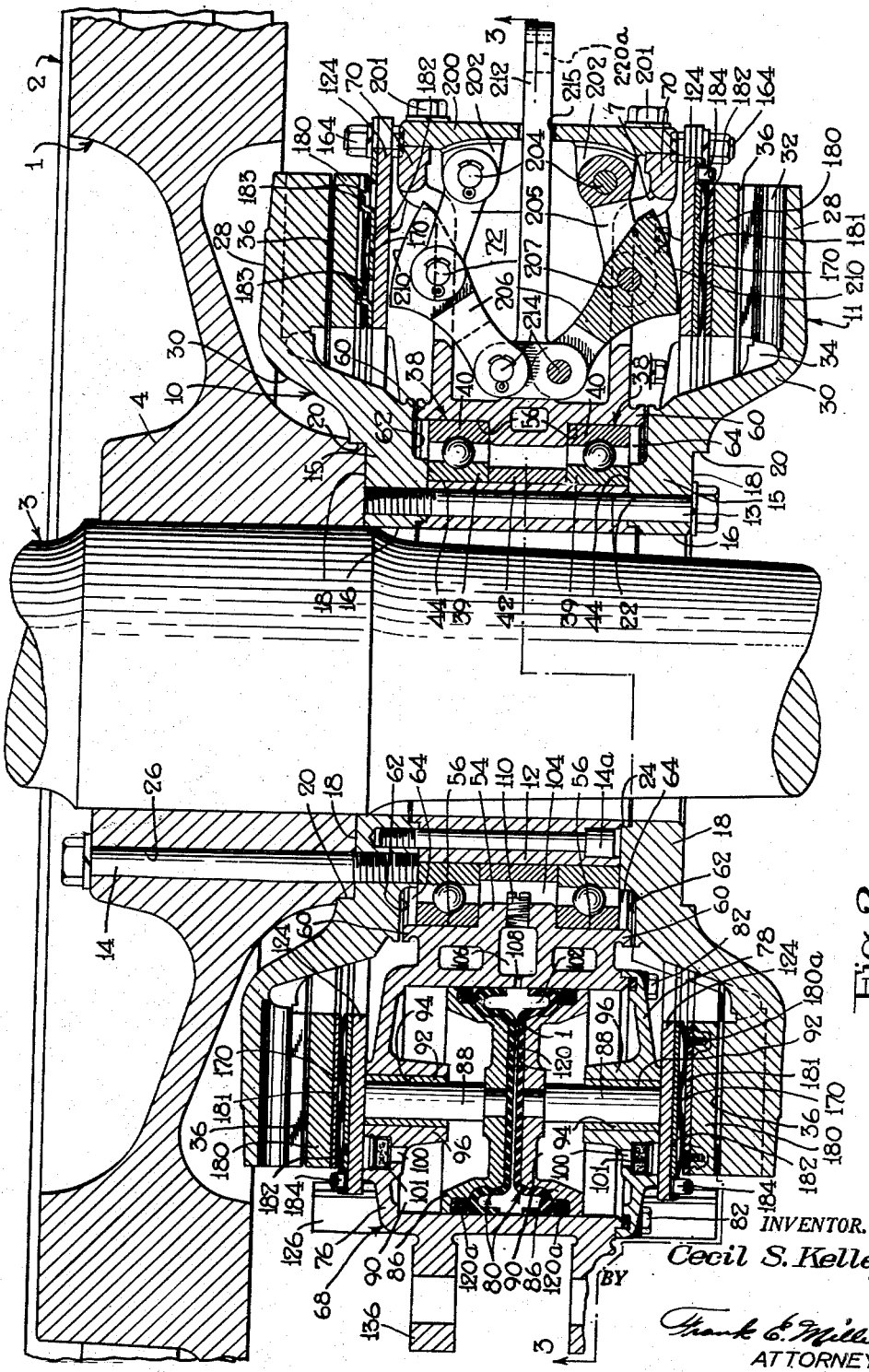
Figure 3:
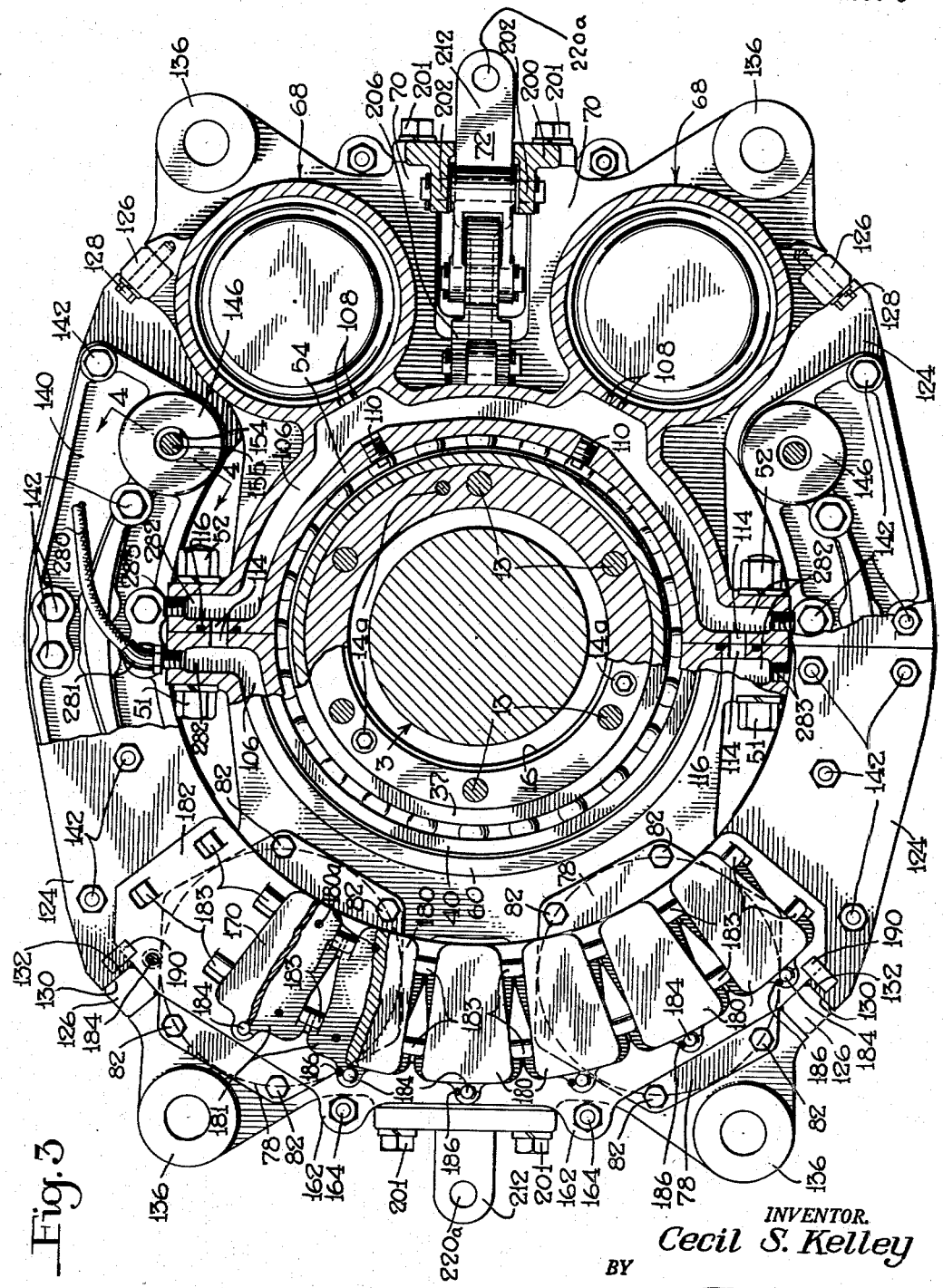

In the accompanying drawings; Fig. 1 is an end view of the improved brake apparatus shown applied around an axle to the inboard face of a railway vehicle wheel; Fig. 2 is a sectional view taken on the line 2—2 in Fig. 1; Fig. 3 is a sectional view taken on the line 3—3 in Fig. 2; and Fig. 4 is a sectional view of a release spring and housing taken on the line 4—4 in Fig. 3.

Description

As shown in the drawings, the reference numeral 1 designates one wheel of a wheel and axle assembly of a railway vehicle truck adapted to roll on the usual rail 2, and reference numeral 3 designates the axle of the assembly, the wheel 1 having a hub 4 in which one end of the axle is mounted. Reference numeral 5 designates a transom of the vehicle truck.

The disc brake mechanism embodying the invention comprises two annular brake rotors 10 and 11 which are spaced apart and rigidly secured by cap screws 13 to opposite ends of a hollow cylindrical bearing mount element 12, said rotors and mount being secured to the wheel hub 4 by a plurality of cap screws 14. The structure of the rotors 10 and 11 constitute the subject matter of my copending application, Serial No. 158,548, filed April 27, 1950, now Patent No. 2,587,047 issued Feb. 26, 1952, and assigned to the assignee of the present application.

The rotors 10 and 11 are alike to render same interchangeable and to simplify manufacture. Each rotor 10, 11 is provided with a hub portion 15 having a central bore 16 of slightly greater diameter than the usual raised portion of the axle 3 upon which the wheel is pressed so that whichever rotor may be mounted against the wheel may easily slide over any of the raised portion of the axle which may extend beyond the end of the wheel hub 4. Each rotor is provided with an annular machined face 18 extending radially outward from the bore 16. A machined annular face 20 is formed in each rotor coaxially with the bore 16 intersecting with face 18 at its outer periphery. The face 18 of the rotor 10 provides a smooth surface for bearing against the inboard end of the wheel hub 4 which is machined to offer a smooth bearing surface for same. On the rotor 10, the face 20 engages an accommodating face of an annular peripheral shoulder machined on the hub 4 at its inboard end to accurately locate the rotor 10 so as to be coaxial with the wheel 1. The face 18 on the rotor 11 provides a smooth surface to accommodate the heads of the cap screws 13 which extend through aligned bores 22 in the rotor 11 and cylindrical bearing support element 12 into screw-threaded engagement with the rotor 10. The bearing support element 12 is thus clamped between the rotors 10 and 11, by action of the cap screws 13, which rotors are thereby spaced apart and secured one to the other. A machined annular rib 24 is formed at each end of the element 12 to fit into an annular socket shoulder formed in the rotors 10, 11 for their accurate radial alignment in conjunction with element 12. The rotor 10 is secured tight to the wheel hub 4 by the cap screws 14 which extend from the outboard side of the wheel through bores 26 in the hub 4 into screw-threaded attachment with said rotor.

Each of the rotors 10 and 11 comprises a braking portion 28 which is joined to the hub portion 15 by a continuous portion 30 which is shaped to give strength to the rotors. The braking portion 28 of each rotor is provided with a plurality of circumferentially spaced radial openings 32 which extend from the portion 30 to the outer peripheral edge of the rotor. Such openings allow for circulation of air radially outward therethrough for cooling the braking portion of the rotor. Such circulation of air is encouraged by the fan action of webs 34 which separate the inner entrances to the openings 32. The braking portion 28 of each rotor is also provided with an annular radially extending braking surface 36. A plurality of radially extending expansion slots equal in number to the number of openings 32, are provided in the braking portion 28, one of such slots opening from the braking surface 36 into each of the openings 32 to aid in cooling and to break up the portion of the rotor from the openings 32 to the braking surface into, in effect, a plurality of spaced apart integral braking pads or blocks, one between each adjacent two slots in order to prevent excessive stresses due to heating of such surface.

Ball bearings 38 are mounted on the hollow cylindrical bearing support element 12 for supporting a stator assemblage which will be described in detail subsequently. Each of the bearings 38 comprises the usual inner and outer spaced apart coaxial rings 39, 40, respectively, which are rotatable one relative to the other. The inner rings 39 of the bearing fit snugly around the element 12. A spacer ring 42, also fitted around element 12, is interposed between the inner rings 39 to determine the spacing of the bearings 38. Inner rings 39 and ring 42 are then held retained in their proper spaced relationship by contact with the rotors 10 and 11 when the latter are held secured together by the cap screws 13; a shoulder 44 being formed in each rotor for such contact.

The stator assemblage comprises two similar, oppositely arranged, semi-circular castings which are secured together in end to end relation (Fig. 3), above and below the axle 3, by means of bolts 51 (and cooperating nuts 52) extending through a pair of outwardly projecting mating flanges at opposite sides of the assemblage to form a continuous symmetrical casing for disposition between the two rotors 10, 11 when same are secured in place, as shown in Fig. 2. Referring to Fig. 2, each portion of the casing is provided on its inner face with a semi-circular rib, the two ribs on the two portions abutting to form an annular rib 54, of axial length equal substantially to that of the spacer ring 42, to fit snugly between the outer rings 40 of the ball bearings 38 and thereby accurately locate the casing equidistant from the rotors when the two sections of the casing are bolted together. At opposite sides of the inner rib 54, each casing section is provided with an annular shoulder 56 for seating engagement with the outer rings 40 of the spaced apart bearings 38. When the two portions of the casing are bolted together as shown in Fig. 3, such casing is clamped to the outer rings of the roller bearings 38 so that the wheel 2, and brake rotors 10, 11 may rotate relative to the assembled casing which is restrained from rotation by suitable means to be described hereinafter.

The casing is further provided with an annular sealing rib 60, half on each portion of the casing, extending from each shoulder 56 in an axial direction and which projects into proximity with the respective inner faces 62 formed in each of the rotors 10, 11 radially outward from the shoulders 44 to define a clearance space 64 at opposite ends of the bearings 38 through which grease may be admitted to the bearings for lubricating same. A grease fitting or fittings (not shown) is provided to communicate with the spaces 64, and to assure penetration of lubricant to the balls and raceways of the bearings; the pertinent dimensions of the spacer ring 42 and rib 54 are such that clearance is provided therebetween which is open to the adjacent ends of the bearings.

Referring to Figs. 2 and 3, each portion of the casing further comprises two spaced apart brake cylinders 68 disposed, respectively, above and below the horizontal center line of the brake apparatus and at opposite sides of a mounting bracket 70 which is provided to accommodate novel hand brake actuating mechanism 72. One end of each brake cylinder 68 is closed by an integral head 76, while the opposite end of each is closed by a removable head 78 secured to the casing by bolts 82 to allow for removal and insertion of a pair of opposed brake cylinder piston assemblages 80.

Referring to Fig. 2, each of the opposed piston assemblages 80 comprises a piston head 86 to which is attached a piston thrust rod 88. Each rod 88 extends through a chamber 90 at one side of the piston head 86 and through a sleeve 92 inserted in a bore 94 which extends from chamber 90 to the exterior of the casing. The bore 94 is formed in a boss 96 attached integrally to each of the cylinder heads 76 and 78 and is of such length as will allow for guiding support of the rods 88 to prevent cocking of the piston heads 86 within the cylinders. Each of the chambers 90 at one side of the piston heads 86 is open to atmosphere by way of an exhaust port 100 in heads 76, 78 to relieve any pressure which may tend to be built up due to movement of the piston head 86 in the direction of the chamber 90. A curled hair strainer 101 is suitably mounted in each cylinder head over the exhaust port 100 to prevent entrance of dirt into the chamber 90 when the piston head is caused to move in its opposite direction away from chamber 90. Intermediate each pair of opposed piston assemblages 80 in each cylinder 68 is a brake cylinder pressure chamber 102 which communicates with the corresponding chamber in every other cylinder 68 by way of a cored passage 106 and respective drilled openings 108 in the casing. Removable plugs 110 in screw-threaded attachment with the casing are provided in openings opposite the interior ports 108 to provide for the original drilling of same and for subsequent periodic inspection or cleanout.

The passage 106 in one portion of the casing communicates with the corresponding passage in the other portion by means of a pair of openings 114 in the flanges at opposite sides of the casing; each pair of openings being in registry when the casing portions are bolted together, as they are shown in Fig. 3. A sealing ring 116 is disposed in a groove encircling an opening 114 in one casing portion for sealing engagement with a face of the bolting flanges encircling the corresponding opening to prevent leakage of fluid under pressure to atmosphere by way of engaging faces of the respective casing flange portions.

Referring to Fig. 2, to prevent leakage of fluid under pressure past each piston head 86 from chamber 102 into chamber 90, a resilient packing cup 120 is provided which fits over the end of the head for slidable sealing engagement with the inner wall of the cylinder. The usual lubricating swab and retaining ring 120a are provided on each piston head for storing and distributing lubricant to the cylinder walls.

The stator assemblage further comprises two spaced apart annular thrust plates 124 disposed in the path of travel of the oppositely arranged piston thrust rods 88, respectively, and which are slidable axially of the rotors 10, 11 on four torque bars 126 which are spaced apart, two above and two below the horizontal center line of the brake apparatus and which are removably secured by means of bolts 128 to the casing. The thrust plates 124 are provided both above and below the horizontal center line of the brake apparatus with shoulders 132, shown in Fig. 1, for slidable engagement with adjacent faces of the respective torque bars to allow for such axial movement and for transmitting torque from the thrust plates to the stator casing which is adapted to be secured against rotation by provision of a plurality of pin lugs 136 spaced about the outer periphery of the casing to be employed singly or in groups for pin connection with linkage to a stationary member of the vehicle truck frame.

Referring to Fig. 1, a typical arrangement for securing the stator casing against rotation with the vehicle wheel might comprise a rigid yoke member 137, disposed at the top of the brake, which extends between two lugs 136, on respectively, the two portions of the casing and is connected at its opposite ends by means such as pins 137a to these lugs. Suitable retaining means (not shown) hold pins 137a in place. The yoke member 137 may then be rigidly connected to a member 137b attached to such as transom 5 of the vehicle truck by means of a rigid connecting bar 137c which is removably connected at its one end by means of a pin 137d to truck member 137b and at its opposite end by a pin 137e to the yoke member. A plurality of openings 137g are provided in the yoke member 137 which will accommodate the pin 137e to allow a standard size connecting bar 137c to be employed on vehicles whose truck members are spaced differently.

Each of the annular thrust plates 124 comprises two oppositely arranged, substantially semi-circular segments arranged in substantial end to end abutting relationship directly above and below the axle 3 and which are rigidly connected together by an arcuate shaped release spring housing 140 bridging each pair of abutting ends and which is removably secured at its oppositely extending ends to such segments by means of bolts 142. There are two release spring housings 140 per thrust plate 124, all of such housings being disposed between the two thrust plates with those on one plate arranged opposite to those on the other plate. Each release spring housing comprises an integrally formed spring retainer cylinder 146 at each of its two ends. Referring particularly to Fig. 4, each of the retainer cylinders 146 has an opening at one end which intersects a face 148 of the housing, which housing fits flat against the thrust plate 124 when the housing is bolted thereto as it is so shown in Fig. 3. When the housing 140 is removed from the thrust plate 124, the opening in face 148 allows for removal and insertion of a brake release spring 150 into and out of the spring cylinder 146. In each of the spring cylinders 146, an end wall 152 therein opposite the face 148 is provided with an opening 154 to allow for extension of a rod 155 therethrough from the cylinder associated with one thrust plate into the aligned cylinder of the other thrust plate. Opposite ends of each rod 155 are provided with a spring seat washer element 158 which accommodates one end of the release spring 150 the opposite end of which abuts the end wall 152 within the respective cylinder 146. The release springs 150 are compression springs and, as assembled in two oppositely arranged cylinders 146, urge said cylinders and the thrust plates 124 axially toward each other and away from the respective rotors 10 and 11.

To retain the washer elements 158 on the rods 155, a horse shoe retaining washer 160 is provided which fits in the usual annular groove provided near each end of the rod. The retaining washer 160 in turn is retained in the rod groove by peripheral engagement with a dished portion of the respective washer 158 encircling washer 160 when urged thereagainst by action of the spring 150. To remove any of the release springs 150, the opening from housing face 148 into spring cylinder 146 is made accessible by removal of the housing 140 from the respective thrust plate 124, the washer element 158 may then be forced away from the horse shoe washer 160 to allow for its removal, after which the washer 158 will slip off the end of rod 155 to set the spring 150 free; it then may be removed, replaced, or reinserted as desired.

As will be evident from study of Figs. 3 and 4, action of each pair of spring assemblages, including two release springs 150, a rod 155 common to both springs, the seat washers 158, one at each end of the rod 155, and the aligned spring cylinders 146, one on each pair of spaced apart spring housings 140 arranged in parallel, will urge the two housings toward each other. Since a pair of such spring assemblages are provided at each end of each pair of such spring housings and arranged in parallel, spring forces are in balance and allow for parallel separating movement of one housing relative to the other and return movement in parallel of the two housings toward each other. When such a pair of housings 140, together with their two pairs of release spring assemblages, are bolted to the spaced apart thrust plates 140 which are interposed at opposite sides of the respective brake cylinder piston thrust rods 88 and between the rotors 10, 11, the release springs 150 in such assemblages will cause movement of the thrust plates toward each other until same engage the bosses 96 of the casing at each brake cylinder to define a release position thereof in which position they are shown in Figs. 2 and 4. During such movement of the thrust plates 124 as above described, the brake cylinder piston thrust rods 88 and brake cylinder piston assemblages 80 will be moved in the direction of chamber 102 to a release position in which one pair of such piston and thrust rod assemblages is shown in Fig. 2. There are two pairs of release spring housings 140 attached to the thrust plates 124 and same are disposed in an oppositely arranged fashion so as to give a symmetrical circumferential distribution of release spring assemblages about the thrust plates. Each pair of parallel arranged housings 140 are disposed outside the stator casing in space between two spaced apart brake cylinders 68 at top and bottom of the disc brake apparatus and the spring coupled pairs of spring cylinders 146 extend in such space between the two parallel thrust plates; openly accessible from the periphery of the disc brake for removal or insertion of the bolts 142.

Each thrust plate 124 carries on its face adjacent the respective rotor 10 or 11 two groups of stator brake shoes 180, arranged diametrically opposite each other horizontally of the brake structure, frictional braking engagement with the said rotor. Each of the stator brake shoes 180 is secured by means of screws 180a or the like to a backing plate 181 and each backing plate is removably attached to an arcuate mounting plate 182 by means of interlocking fingers 183 and a retaining pin 184.

As may be seen from Fig. 3, each mounting plate 182, two of which are provided for each rotor circumferentially between the respective spring housings 140, carries seven stator brake shoes 180, for example, and each of the seven backing plates 181, to which the seven brake shoes are attached, is provided with four of the fingers 183, two at each side, spaced apart at top and bottom, which fingers 183 slide into position behind corresponding fingers formed in and properly spaced about on the mounting plate 182. The interlocking fingers 183 retain the backing plates 181 and shoes to the mounting plate against inward radial and sidewise movement relative to such plate. The retaining pins 184, one for each backing plate 181, prevent radially outward movement of the backing plate on the arcuate mounting plate 182. Each of the backing plates is provided with a projecting lug which lug is provided with an opening through which the retaining pin 184 may extend. The mounting plate 182 in turn is provided with a plurality, seven for example, of openings for registry with the openings in the backing plate lugs, once such backing plates have been fit onto one face of the mounting plate. The retaining pins 184 may be inserted through the registering openings from the opposite face of the mounting plate.

One end of each retaining pin is provided with a flat head which fits in a socket formed in the mounting plate at each opening and provides a smooth continuous surface of the mounting plate 182 for abutment with the thrust plate 124 while holding the retaining pin in place. The opposite projecting end of each of the retaining pins is provided with a small transverse opening to accommodate cotter pins 186 or the like to prevent such pins from falling out when the mounting plate is removed from the brake, as will be described subsequently.

Upon assembly of the mounting plate 182 to the disc brake, the mounting plate, including stator brake shoes, may be slipped in at an angle between the respective rotor and thrust plate 124, held in sliding contact with such thrust plate and slid into abutment with respective torque bars 126 and behind fingers 190 attached to the thrust plate. The mounting plate 182 may at the same time be slid on the respective thrust plate 124 to bring registry of corresponding bolt holes in lugs 162 which are provided on the thrust plate and on the mounting plate. The mounting plate 182 is then removably secured in proper position of the thrust plate 124 by means of bolts 164 inserted through the registering openings in lugs 162. The usual nuts are screwed onto the bolts and tightened to hold the mounting plate in engagement with the thrust plate for movement therewith; which purpose the fingers 190 also serve. By removal of the bolts 164, each mounting plate 182 may be slid on the respective thrust plate 124 free of the fingers 190, cocked at an angle and slipped out of the brake assemblage for replacement of a shoe or shoes 180, for example.

In fluid pressure operation of the disc brake unit, when fluid under pressure is simultaneously supplied to the pressure chamber 102 in each of the four brake cylinders 68 via passages 106 and ports 108, the opposed brake cylinder piston assemblages 80 in each brake cylinder will cause axial sliding movement of the thrust plates 124 on the torque bars 126 to bring the stator brake shoes 180 carried by the thrust plates into frictional engagement with the braking surface 36 of the rotors 10 and 11 to cause a braking force to be applied for restraining rotation of the wheel.

To assure that each brake shoe 180 does its share of the work in case of variations in thickness of one shoe from another, a serpentine spring plate 170 may be inserted between the mounting plate 182 and the backing plate 181 of each shoe 180 prior to clipping the backing plate onto the mounting plate. The serpentine spring plate is dimensioned to fit fairly snugly at its edges between the interlocking fingers 183 and is provided with a lug, corresponding to the lug on the backing plate, having the opening through which the retaining pin 184 extends to hold the spring plate in place radially of the annular segmental mounting plate. During a brake application with the stator shoes 180 urged into frictional engagement with the rotors 10, 11 by the thrust plates 124, the serpentine spring plate behind each shoe backing plate 181 will deflect to the extent as will allow all shoes 180 to exert the same force on the rotor braking surface regardless of slight variance in thickness of the individual stator brake shoes.

Upon release of fluid under pressure from the pressure chambers 102 in each brake cylinder 68, the release springs 150 will effect movement of the thrust plates 124 to cause the stator brake shoes 180 carried by such thrust plates to leave the rotor braking surfaces for a brake release; with corresponding movement of rods 88 and piston assemblages 80 to respective release positions in which they are shown in the drawing, as will be appreciated from previous description.

To provide for supply and release of fluid under pressure to and from the brake cylinders 68, the usual brake cylinder pipe in the form of a flexible hose 280, for example, is connected by a fitting 281 to one of four openings 282 to passage 106 in the stator casing, two above and two below the horizontal center line of the brake; four being provided for sake of convenience. The remaining three unused openings 282 may be closed by plugs 283.

For manual operation of the disc brake assemblage, two diametrically opposite manual brake actuating units are provided, one on each portion of the brake stator casing between the respective brake cylinders 68. Each of the hand brake actuating units comprises a cap plate 200 which is removably secured to the respective stator casing portion by means of bolts 201. The inner side of the cap plate 200 is provided with two spaced apart integrally attached arms 202. To each of the arms 202 is pin connected at 204 the closed end of a clevis 205, the opposite open end of which fits around a cam and lever element 206 and is pin connected thereto at 207. One end of each cam and lever element 206 is provided with a cam surface 210 for abutment with the respective thrust plates 124 to cause same to slide on the torque bars 126 against opposition of the release springs 150 for engaging the stator shoes 180 with the braking surface 36 on rotors 10, 11 thereby effecting application of the disc brake. To act as a medium through which the above abutment may be effected, a pull rod 212 is provided. One end of the pull rod 212 is pin connected at 214 to the lever ends of both cam and lever elements 206 and the opposite end of the pull rod extends outwardly through an opening 215 in cap plate 200 to the exterior thereof. It will be appreciated, that each of the two manual brake actuating units may be removed as assembled, from the stator casing by removal of bolts 201 to free the plate 200, as all parts are carried by such plate.

The outer projecting end of each pull rod 212 is provided with an opening 220a for operable connection with actuating linkage. When a pulling force is applied to the rod 212 and same is moved outwardly of the plate 200, the cam and lever elements 206 will be caused to rock about their respective pin connections at 207 as their connections 214 travel with the pull rod 212, while the clevises 205 simultaneously rock about the pin connections 204. Above rocking movement of the clevises advances the pin connections at 207 toward thrust plates 124, carrying the cam surfaces 210 into abutting relationship with the thrust plates, while the above rocking movement of the cam and lever elements 206 will cause rolling movement of the cam surfaces 210 on the thrust plates 124 as the latter are caused to slide on torque bars 126 by separation of pin connections 207 with rocking of the clevises 205 as pull rod 212 continues to move outwardly of the plate 200. Such movement of the thrust plates 124 will carry the stator brake shoes 180 into frictional engagement with the braking surface 36 of the rotors 10 and 11, whereupon continued outward movement of the pull rod 212, clevises 205, and cam and lever elements 206 will substantially terminate while continued application of pulling force to pull rod 212 will transmit thrust force to the stator brake shoes to apply restraining force to the wheel through frictional engagement between rotor and stator. Due to symmetry of the linkage through which the pulling force on pull rod 212 is transmitted to the thrust plates 124 as above described, the force thus delivered each thrust plate will be equal. It will be seen that due to the nature of the arrangement of clevises 205 and cam and lever elements 206, as pull rod 212 is moved outwardly of cover plate 200 equal increments of distance, the pin connections 207 will move apart toward thrust plates 124 decreasing increments of distance. By virtue of the shape of the cam surfaces 210 which are simultaneously turned about the pin connections 207 as same travel apart decreasing increments with equal increment in pull rod travel, the thrust plates 124 in engagement with the cam surfaces will be caused to move equal increments in distance with equal increments in travel of the pull rod. It will be appreciated also that the leverage ratio from pull on the rod 212 to thrust on plates 124 will remain constant regardless of the distance which the plates might need to travel before the stator shoes 180 engage the rotors 10, 11, which distance will vary with shoe wear. Thus it will be seen that regardless of brake shoe wear, the hand brake actuating units may be depended upon to deliver a certain brake application force for any given pulling force on rod 212.

Upon termination of application of a pulling force to the pull rod 212, action of the release springs 150 on thrust plates, as aforedescribed will urge movement of same to their respective release positions. Such release movement of the thrust plates and stator shoes 180 carried thereon will be allowed upon return of the manual brake actuating unit parts to their respective release positions, in which they are shown in the drawing, by inward movement of the pull rod 212 through opening 215 in cover plate 200.

Typical rigging for operation of both of the two manual brake actuating units on the disc brake is shown in Fig. 1, and such rigging may comprise a dead lever 220 fulcrumed at its one end by a pin 221 to one end of the fixed member 137 and connected intermediate its ends by a pin 222 to the projecting end of the pull rod 212 of one brake actuating unit. By counter-clockwise rocking movement of the dead lever 220 about pin 221, as viewed in Fig. 1, the respective brake actuating pull rod 212 will be urged outwardly of the cover plate 200 to actuate the thrust plates 124 for a brake application as will be appreciated from previous description. Conversely, when the dead lever 220 is rocked about pin 221 in the opposite direction, the same pull rod 212 will be moved inwardly of the respective cover plate 200 to effect release of a mechanical brake application. Similarly, one end of a link 222a is provided which is pivotally connected by a pin 223 to the opposite end of the fixed member 137, while the opposite end of the link 222a is pivotally connected by means of a pin 224 to the respective pull rod 212 of the other brake actuating mechanism. When the link 222a is caused to rock in a clockwise direction, as viewed in the drawing, about pin 223 the respective pull rod 212 will be pulled outwardly from the respective cover plate 200 to cause spreading of the thrust plates 124 at the respective side of the brake for applying same. Conversely, rocking movement of link 222a in the opposite direction will cause inward movement of the respective pull rod 212 for releasing the brake application.

A live lever 226 is provided which is pivotally connected by means of a pin 228 to one end of a pull rod 230 which may be actuated by such as the usual hand brake wheel and interposed linkage (not shown). The opposite end of the live lever 226 is pivotally connected by means of a pin 232 to one end of a tie rod 234 extending from one side of the brake to the other. The opposite end of the tie rod 234 is connected by means of a pin 236 to the lower end of the dead lever 220. The end of the link 222a which is connected to the respective actuating unit pull rod 212 is also connected by means of a pin 238 to the live lever 226 intermediate its ends. By means of such rigging, by actuation of the pull rod 230 in one direction both the actuating mechanism pull rods 212 may be moved outwardly to effect frictional engagement of the stator brake shoes 180 at both sides and ends of the brake for applying same, while movement of the pull rod 230 in its opposite direction will permit movement of both of the pull rods 212 inwardly to release the brake application.

Each of the manual brake actuating units above described is located equidistant between opposite ends of the mounting plate 152 for each assemblage of stator shoes 180 so that the mechanical brake applying force will be transmitted centrally thereto for even distribution to all shoes.

As an assembled brake unit mounted directly on and carried by the wheel 2, such unit may remain secured to the wheel while same is removed from or pressed onto the axle 3.

As an assembled brake unit on the wheel, the entire brake unit may be set free of the wheel by removal of the cap screws 14 from the outboard side of the wheel, the cap screws 13 securing the rotors 10, 11 and bearing mount for the stator casing together during such operation.

On or off the wheel, the disc brake unit may be disassembled in part or entirely for any reason such as replacement of parts.

For example, should it be desired to remove the rotor 11 from the unit, for refinishing the braking surface 36, for replacement, or to expose the brake cylinder heads 86, removal of cap screws 13 will free such rotor while recessed socket head cap screws 14a will hold the rotor 10 and stator casing bearing mount portion together.

Subsequent to removal of the rotor 11, with stator casing, bearing mount and rotor 10 still assembled, by removal of the respective bolts 82 any or all of the four brake cylinder heads 78 may be removed from the stator casing for removal, inspection and possible replacement of any of the piston assemblage 80 parts, such as packing cup 120, for example.

With the disc brake assembled as a unit, cap screws 13 and 14a in place, the unit being on or off the wheel 1, and both rotors 10, 11 secured together at opposite sides of the stator casing, the stator shoe mounting plates 182 may be removed from the thrust plates 124 for examination of the shoes 180 carried by these mounting plates in fashion as aforedescribed, that is, by removal of bolts 164 etc., and replaced in manner also as aforedescribed.

Also with the disc brake assembled as a unit and either on or off the wheel, if for any reason it be desired to remove the stator casing, nuts and bolts 51, 52 shown in Fig. 3 may be removed to free the two halves of the casing from each other and from the two ball bearings 38, which halves may then be slid out from between the two thrust plates 124.

Again with the disc brake assembled as a unit on or off the wheel, with the rotors 10, 11 and stator casing functionally assembled in place, as aforedescribed, the spring housing 140 may be set free from the thrust plates 124 by removal of the bolts 142, either for inspection or replacement of the release springs 150 or to part the two halves of the thrust plates 124. Subsequent to removal of the bolts 142, by removal of the bolts 129, the torque bars 126 may be removed from the stator casing to free the separated halves of the thrust plates 124 for any reason.

Also in manner as aforedescribed, either of the manual brake actuating units may be removed from the stator casing as a unit if desired by removal of bolts 201 to free the cover plate 200.

Summary

It will now be seen that I have provided a relatively simple and improved disc type brake for use on such a railway vehicle and which provides for facile removal and replacement of any of its parts which are subject to wear without requiring removal of substantially more than certain securing bolts at various locations in the brake unit.

Having now described my invention, what I claim as new and desire to secure by Letters Patent, is:

1. A disc brake mechanism for a wheel of a vehicle having a truck frame, said mechanism comprising a first annular brake rotor, removable means securing said first annular brake rotor directly to said wheel for support thereby and rotation coaxially therewith, a cylindrical stator support element, removable means securing said stator support element into abutment at its one end with said first annular brake rotor for support thereby and rotation coaxially therewith, a second annular brake rotor, removable means securing said second annular brake rotor to said first annular brake rotor and into abutment with the opposite end of said stator support element, anti-friction bearing means mounted on said support element, a divided stator casing comprising two sections adapted to fit onto said bearing means to form a continuous stator casing between the first and second brake rotors, removable means securing two sections of said stator casing together, removable anti-rotation means securing said stator casing to said truck frame, a plurality of torque bars removably secured to said stator casing and spaced circumferentially thereabout, a first annular thrust plate comprising two sections adapted to form a continuous annular thrust plate disposed between one end of said stator casing and said first annular brake rotor coaxially therewith and retained in such attitude and restrained from rotation by peripheral slidable engagement with said torque bars, a second annular thrust plate comprising two sections adapted to form a continuous annular thrust plate disposed between the opposite end of said stator casing and said second annular brake rotor coaxially therewith and retained in such attitude and restrained from rotation by peripheral slidable engagement with said torque bars, a first pair of release spring housing elements, removable means securing said first pair of release spring housing elements to said first annular thrust plate to hold its two sections together, a second pair of release spring housing elements, other removable means securing said second pair of release spring housing elements to said second annular thrust plate to hold its two sections together, a plurality of release spring means arranged to urge the first pair of release spring housing elements toward the second pair of release spring housing elements, a plurality of stator brake shoes removably secured to the first and second annular thrust plates, and a plurality of fluid pressure brake cylinder means carried by said stator casing and disposed between the first and second annular thrust plates for urging same toward the first and second annular brake rotors to cause frictional engagement of the stator brake shoes thereon with said rotors.

2. The combination with disc brake mechanism having a pair of spaced apart brake rotors, and a pair of spaced apart brake stators disposed between said brake rotors and slidable into and out of frictional engagement therewith, of a non-rotatable member disposed between said brake stators, a pair of spaced apart links pivotally connected at their one end to said non-rotatable member, a pair of cams pivotally connected to the opposite ends of said links, respectively, for rocking contact with said stators, a pair of levers attached at their one end to said pair of cams, respectively, and an actuating rod pivotally connected at its one end to the opposite ends of both of said levers.

3. In combination, a pair of spaced apart parallel disc brake stators movable axially, a pair of aligned hollow cylindrical spring housings disposed intermediate and removably secured to said stators, respectively, and provided with respective annular shoulders at adjacent ends, a rod extending through said shoulders into both of said housings, a pair of spring seats associated with opposite ends of said rod, respectively, and a pair of compression springs disposed in said housings, respectively, each of said springs abutting at its one end the respective annular shoulder and at its opposite end the respective seat.

4. A disc brake mechanism comprising two spaced apart coaxially rotatable discs to be braked, an annular non-rotatable structure disposed between said rotatable discs and having a center line coincident with the axis of said discs, a plurality of torque bars carried by said structure and spaced apart symmetrically about the outer periphery thereof in parallel relationship with said center line to define a plurality of bearing surfaces, two brake shoe carrying rings disposed between said rotatable discs and the opposite sides of said structure, respectively, in slidable cooperation at their outer peripheries with said bearing surfaces for support thereby and transmission of torque reaction therebetween, each of said rings comprising two semi-circular parts oppositely arranged in substantial end to end abutting relationship with the abutted ends disposed between said bearing surfaces of the respective torque bars, a rigid member overlying each pair of abutted ends of both rings and secured thereto and having sliding contact at opposite ends with said bearing surfaces on the adjacent torque bars, actuating means in said structure between said rings for moving said rings in opposite directions into braking relation with the respective discs, and stressed spring means disposed between and connected to axially aligned pairs of said rigid members for urging said rings out of braking relation with said discs.

5. A disc brake mechanism comprising two spaced apart rotatable discs to be braked, an annular non-rotatable structure disposed between said rotatable discs, four torque bars carried by said structure spaced apart symmetrically in pairs, two at one side and two at the other of a center line of said mechanism and extending parallel to the axis of said mechanism and each pair having adjacent bearing surfaces, two brake shoe carrying rings in axially-slidable anti-rotatable supported cooperation at their outer peripheries with said torque bars, one of said rings being disposed between each of said rotors and the adjacent side of said structure, each of said rings comprising two semi-circular parts oppositely arranged in substantial end to end abutting relation with the abutted ends disposed between said bearing surfaces of the respective torque bars, a rigid member overlying each pair of abutted ends of both rings and secured thereto, a pair of arcuate brake shoe means mounted against each ring between, respectively, opposite adjacent ends of the respective rigid members for frictional engagement with the adjacent rotor, opposite end portions of each brake shoe means at their outer peripheries engaging respectively an inner surface of two of said torque bars one at said one side and the other at said other side of said center line, means removably securing each of said brake shoe means to the respective ring, actuating means in said structure between said rings for moving the two rings and respective brake shoe means in opposite directions into braking relationship with said discs, and stressed spring means disposed between said rings and connected to axially aligned pairs of said rigid members for urging said rings and the respective brake shoe means out of braking relationship with said discs.

6. A disc brake mechanism comprising two spaced apart rotors to be braked, a non-rotatable structure disposed between said rotors, two rotatable brake elements, one disposed between each rotor and said structure for frictionally engaging the respective rotor to brake same, said non-rotatable structure comprising two sets of cams disposed at diametrically opposite sides of said mechanism and each set comprising two oppositely acting cam means engaging respectively the two non-rotatable brake elements, two oppositely arranged pull rods carried by said structure one for actuating each two cam means in unison, two levers, one at either of said sides of said mechanism, carried by said structure and connected intermediate its ends to the respective pull rod, a tie rod connecting one end of one of said levers to the corresponding end of the other lever, a fixed fulcrum for the other end of one of said levers, and means for actuating the other end of the other lever and thereby both levers to actuate both pull rods.

7. A disc brake mechanism comprising two spaced apart rotors to be braked, a non-rotatable structure disposed between said rotors, a non-rotatable brake element disposed between each rotor and said structure for frictionally engaging the respective rotor to brake same, a rigid element, connecting means connecting said element to spaced apart portions of said structure for holding said structure and brake elements against rotation, a pair of actuating means carried by said structure substantially diametrically opposite each other in said mechanism and respectively spaced from said connecting means, a rod for each actuating means for operating same and projecting from said structure, two levers carried respectively by said connecting means and connected respectively intermediate their ends to said rods, the said connecting means for one of said levers constituting a fixed fulcrum for one end thereof, an actuating rod connected to one end of the other lever, and a tie rod connecting the other ends of said levers to each other.

8. In a disk brake mechanism, the combination with two spaced-apart coaxially-aligned brake rotors, of an annular non-rotatable structure disposed between said rotors coaxially therewith, a plurality of torque bars symmetrically spaced apart about the outer periphery of said structure and removably secured thereto in equidistant and parallel relationship with the axis thereof, and two annular brake stators disposed respectively in clearance spaces between the two rotors and the opposite ends of said non-rotatable structure and in axially-slidable, non-rotatable, supported engagement at their outer peripheries with said torque bars for advance and retraction toward and away from said rotors.

9. In combination with a railway vehicle wheel having a hub, a first annular brake rotor in coaxial and abutting relationship with the inboard end of said hub, means removable from the outboard side of said wheel in securing attachment with said first annular brake rotor on the inboard side, a stator support sleeve in coaxial alignment with said first annular brake rotor and in abutment therewith at its one end, means removable from the opposite end of said stator support sleeve extending in an axial direction therethrough in securing attachment with said first annular brake rotor, a second annular brake rotor in coaxial alignment with said stator support sleeve and in abutment with said opposite end thereof and removable means extending in an axial direction through said second annular brake rotor and through said stator support sleeve in securing attachment with said first annular brake rotor.

References Cited in the file of this patent
UNITED STATES PATENTS

| Number | Name | Date |
| --- | --- | --- |
| Re. 22,242 | Eksergian | Jan. 5, 1943 |
| 2,136,806 | Seeley | Nov. 15, 1938 |
| 2,174,400 | McCune | Sept. 26, 1939 |
| 2,277,106 | Hewitt | Mar. 24, 1942 |
| 2,402,400 | Hewitt et al. | June 18, 1946 |
| 2,416,871 | Gaennsle | Mar. 4, 1947 |
| 2,440,020 | Pratt | Apr. 20, 1948 |
| 2,451,326 | Eksergian et al. | Oct. 12, 1948 |
| 2,451,329 | Gaennsle | Oct. 12, 1948 |